United States Patent [19]

Maguran, Jr. et al.

[11] Patent Number: 5,163,706
[45] Date of Patent: Nov. 17, 1992

[54] ELECTRO-HYDRAULIC PRESSURE REGULATING VALVE ASSEMBLY FOR A HYDRAULIC DAMPER

[75] Inventors: Gene A. Maguran, Jr., West Bloomfield; Eugene J. Cascio, Jr., Warren; Donald E. Forton, Sterling Heights, all of Mich.; Donald D. Stoltman, Henrietta; Joseph G. Spakowski, Macedon, both of N.Y.

[73] Assignee: General Motors Corporation, Detroit, Mich.

[21] Appl. No.: 690,439

[22] Filed: Apr. 24, 1991

[51] Int. Cl.$^5$ ............................................. B60G 11/26
[52] U.S. Cl. ..................................... 280/707; 280/714; 188/299; 251/30.02; 137/854
[58] Field of Search ................ 280/707, 714; 188/299; 251/30.01, 30.02, 30.05, 46, 129.16; 137/854

[56] References Cited

U.S. PATENT DOCUMENTS

| 3,125,186 | 3/1964  | Day            | 188/88       |
|-----------|---------|----------------|--------------|
| 4,179,096 | 12/1979 | Fromfield      | 251/30.05 X  |
| 4,196,751 | 4/1980  | Fischer et al. | 251/129.16 X |
| 4,572,436 | 2/1986  | Stettner et al.| 239/585      |
| 4,650,042 | 3/1987  | Knecht et al.  | 188/299      |
| 4,676,273 | 6/1987  | Stoltman       | 137/625.61   |
| 4,693,275 | 9/1987  | Stoltman       | 137/625.65   |
| 4,749,069 | 6/1988  | Knecht et al.  | 188/299      |
| 4,785,920 | 11/1988 | Knecht et al.  | 188/299      |
| 4,802,561 | 2/1989  | Knecht et al.  | 188/299 X    |
| 4,861,068 | 8/1989  | McCabe         | 280/714      |
| 4,902,034 | 2/1990  | Maguran et al. | 280/707      |

FOREIGN PATENT DOCUMENTS 3917964 11/1990 Fed. Rep. of Germany ...... 188/299
1210033 10/1970 United Kingdom ................ 137/854

Primary Examiner—Robert P. Olszewski
Assistant Examiner—Boris Milef
Attorney, Agent, or Firm—A. Michael Tucker

[57] ABSTRACT

A pressure regulating valve assembly includes a valve body mounting an electric solenoid assembly. The solenoid assembly controls the fluid pressure in a chamber defined in the valve body. Fluid in the chamber is biased against a deflectable disc which controls fluid flow through the valve assembly. Control of electric current to the solenoid assembly controls fluid pressure in the chamber and, thus, fluid flow through the valve assembly. When utilized with a damper and a controller, the present valve assembly provides continuously variable damping in real time.

22 Claims, 2 Drawing Sheets

ELECTRO-HYDRAULIC PRESSURE REGULATING VALVE ASSEMBLY FOR A HYDRAULIC DAMPER

BACKGROUND OF THE INVENTION

1. Field of the Invention

The present invention relates generally to an electrically controlled hydraulic damper for a vehicular suspension system. In particular, the present invention is concerned with an electro-hydraulic pressure regulating valve assembly for continuously varying a damping force in real time for semi-active ride control.

2. Description of the Related Art

Electrically controlled hydraulic dampers (shock absorbers and struts) for vehicular suspension systems are well-known. Many controllable shock absorbers utilize an electric solenoid or motor-driven member to select different damping characteristics. Due to small electric actuators and the high friction of the movable members, many known controllable dampers are limited in response time, and are not suitable for real time systems. A particular damping setting, once selected, cannot be changed quickly enough to respond to the next individual suspension movement. In addition, many devices select from a limited group of discrete settings and are not capable of providing continuously variable damping.

The art continues to seek improvements. It is desirable to provide a continuously variable damper capable of real time response.

SUMMARY OF THE INVENTION

The present invention includes an electro-hydraulic pressure regulating valve assembly, particularly suited for use with a hydraulic damper. The valve assembly permits a damper to provide continuously variable damping in real time through a computer controller. Fluid pressure in the valve assembly is proportional to electric current supplied to a solenoid coil. The present, compact valve assembly is suitable for mass production and use on passenger and commercial vehicles.

In a preferred embodiment, the present valve assembly includes a valve body mounting an electric solenoid assembly. The solenoid assembly controls the fluid pressure in a chamber defined in the valve body. Fluid in the chamber is biased against a deflectable disc which controls fluid flow through the valve assembly. Control of electric current to the solenoid assembly controls fluid pressure in the chamber and, thus, fluid flow through the valve assembly. When utilized with a damper and a controller, the present valve assembly provides continuously variable damping in real time.

DETAILED DESCRIPTION OF THE PREFERRED EMBODIMENT

Figure 1:
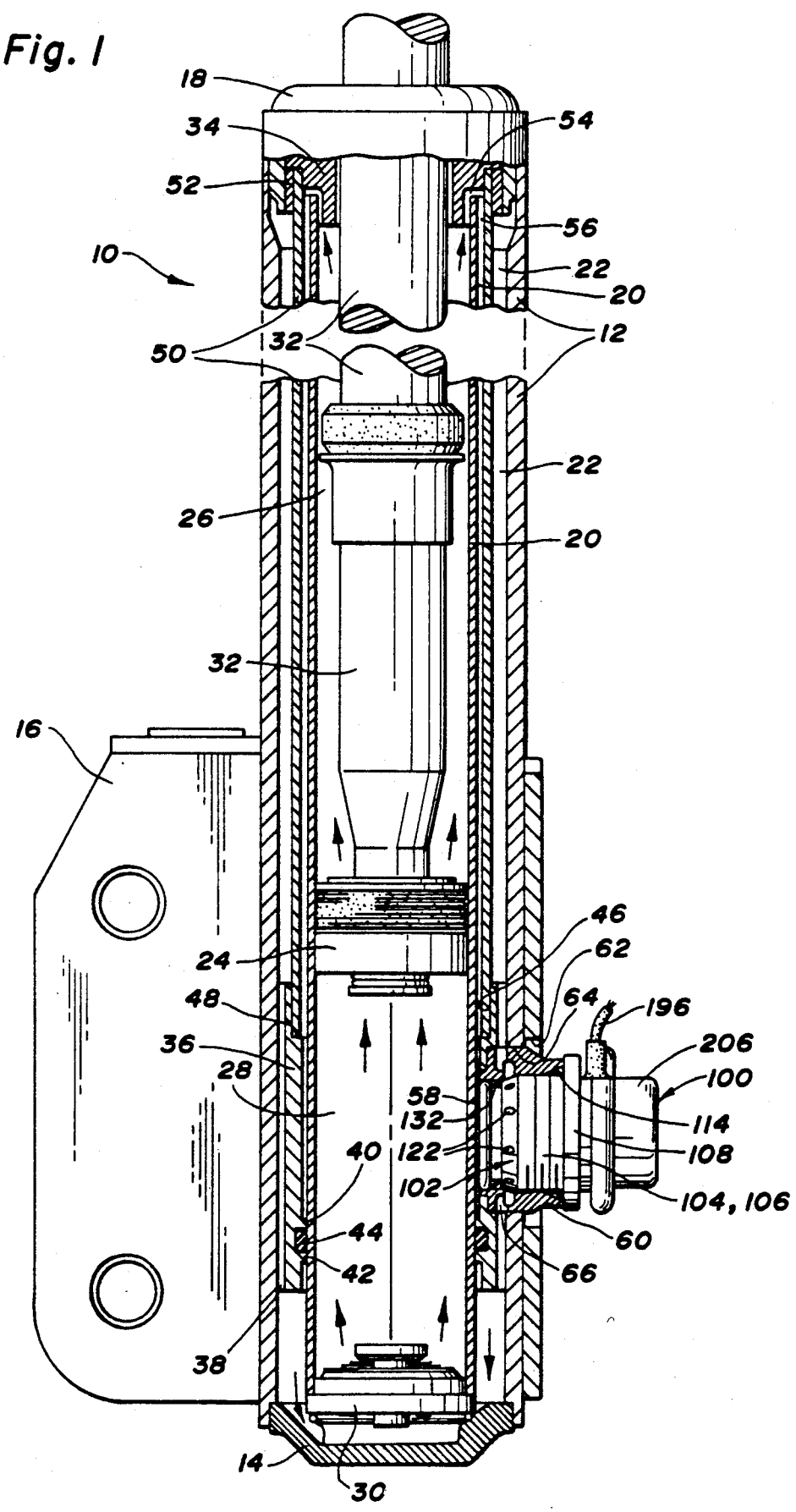
FIG. 1 is a longitudinal sectional view of a hydraulic damper having an electro-hydraulic pressure regulating valve assembly according to the present invention.

A hydraulic damper is indicated generally at 10 in FIG. 1. The damper 10 includes an outer reservoir tube 12 closed at its lower end by an end cap 14. A bracket 16 is provided about a lower portion of the reservoir tube 12 for securing the damper 10 to a vehicular road wheel assembly (not illustrated) in a well-known manner. A seal cover 18 is welded or otherwise secured to the upper end of the reservoir tube 12.

A fluid-filled inner cylinder 20 is spaced inwardly from and concentric with the reservoir tube 12. The interior volume between the inner cylinder 20 and the reservoir tube 12 forms a fluid reservoir 22. A piston 24 is slidably mounted inside the inner cylinder 20 and divides the interior volume of the inner cylinder 20 into an upper chamber 26 and a lower chamber 28. The piston 24 includes internal valving (not illustrated) which permits one-way flow from the lower chamber 28 to the upper chamber 26 as the piston 24 reciprocates in the inner cylinder 20. A compression valve assembly 30 secured to the lower end of the inner cylinder 20 controls the one-way flow of fluid from the reservoir 22 into the lower chamber 28 during operation of the damper 10 as described below.

A piston rod 32 is attached at its inner end to the piston 24 and is connected at its upper end (not shown) to bodywork of a vehicle in any conventional manner. The piston rod 32 passes through a rod guide 34 mounted at the upper end of the inner cylinder 20 and held in position by the seal cover 18. An annular elastomeric seal (not illustrated) is seated on the rod guide 34 and has sealing contact with the piston rod 32 to prevent loss of hydraulic fluid from the upper chamber 26 as the piston 24 strokes in the inner cylinder 20 during operations.

A tubular sleeve insert 36 is fitted between the inner cylinder 20 and the reservoir tube 12 near the lower end of the inner cylinder 20. The sleeve insert 36 includes a plurality of radially, spaced-apart ribs 38 on its outer surface which produce an interference fit against the reservoir tube 12. A pair of annular flanges 40,42 provided on the inner surface of the sleeve insert 36 support a sealing ring 44 which provides a fluid seal against the inner cylinder 20.

An undercut 46 in the upper end of the sleeve insert 36 forms an annular seat 48 for receiving a lower end of an intermediate tube 50 concentrically mounted between the inner cylinder 20 and the reservoir tube 12. The upper end of the intermediate tube 50 is mounted on the rod guide 34. If desired, an annular spacer 52 can be provided between the intermediate tube 50 and the seal cover 18. An annular fluid port 54 is provided in the rod guide 34 to permit fluid to pass from the upper chamber 26 to a bypass channel 56 formed in the annular space between the inner cylinder 20 and the intermediate tube 50. The bypass channel 56 is in fluid communication with an annular fluid receiving chamber 58 formed between the inner cylinder 20 and the sleeve insert 36.

A tubular adapter 60 having internal threads is received in complementary openings 62,64 in the bracket 16 and the reservoir tube 12 and is sealingly secured to the sleeve insert 36 by any suitable means. A plurality of radial channels 66 are provided in the adapter 60 which are in fluid communication with the reservoir 22. As described below, a continuously variable electro-hydraulic pressure regulating valve assembly indicated generally at 100 is threaded to the adapter 60. The valve assembly 100 changes the damping force provided by the damper 10 by permitting fluid to flow from the bypass channel 56 to the reservoir 22 as described below.

Figure 2:
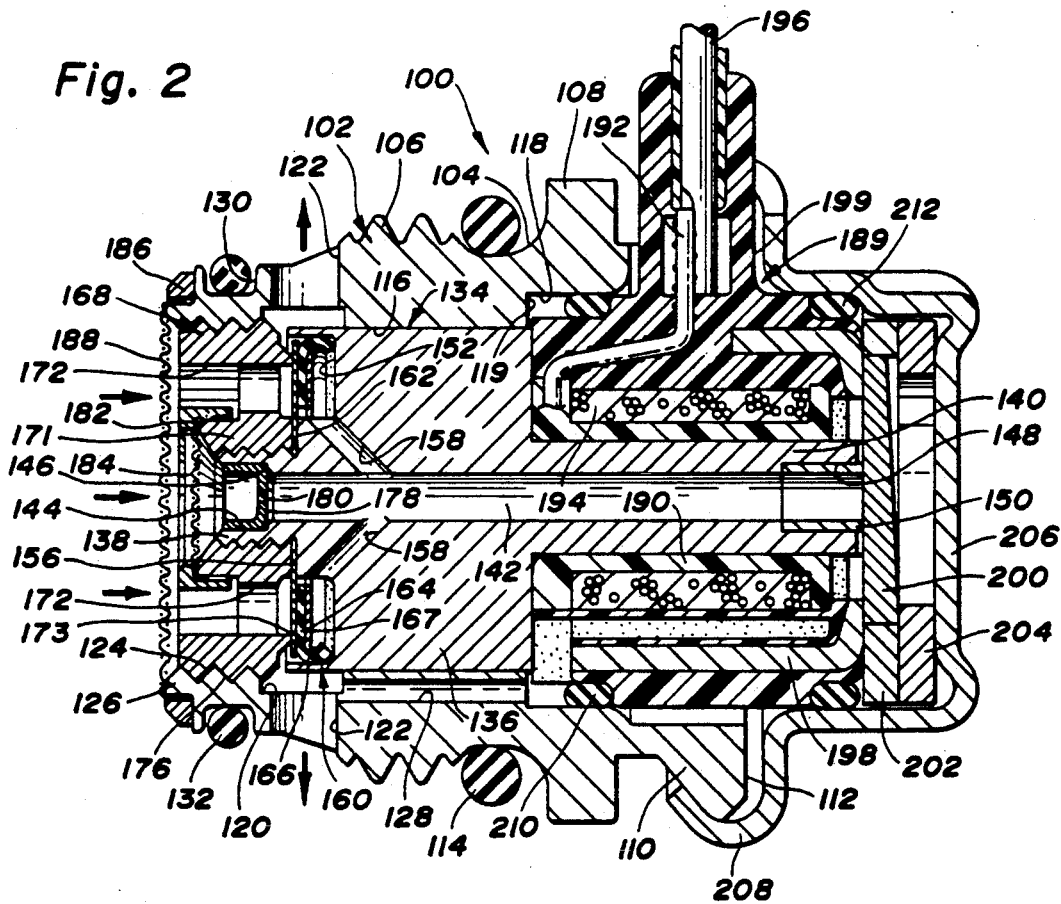
FIG. 2 is a greatly enlarged longitudinal sectional view of the pressure regulating valve assembly of FIG. 1 removed from the damper.
Figure 3:
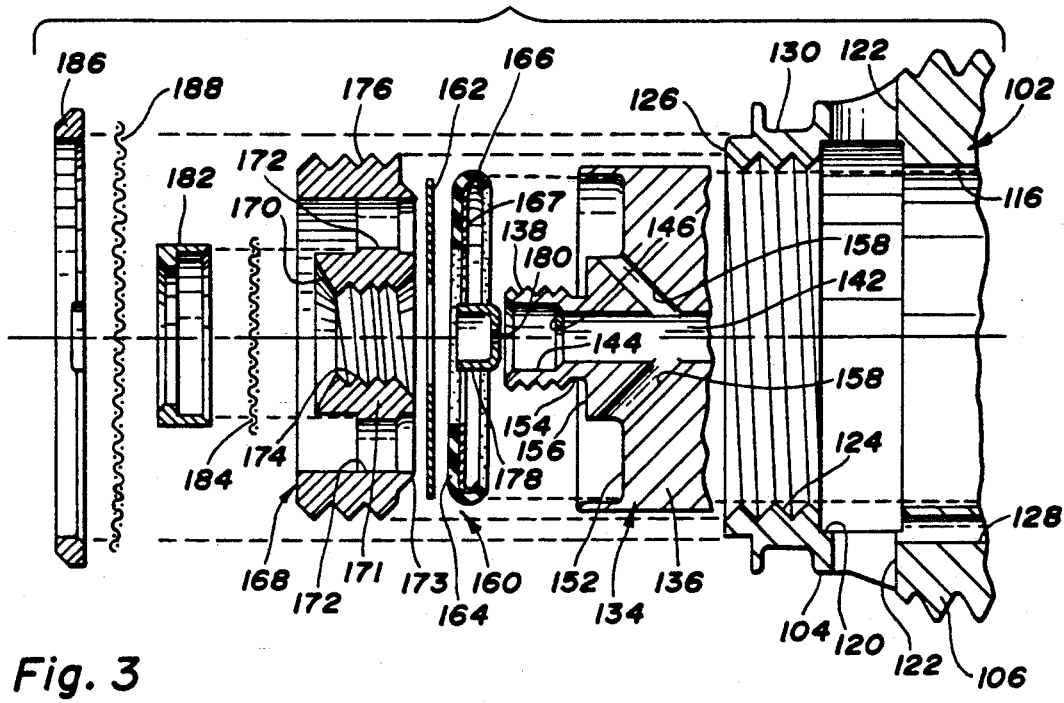
FIG. 3 is an exploded sectional view of a portion of the valve assembly of FIG. 2.

The valve assembly 100, illustrated best in FIGS. 2 and 3, includes a generally tubular valve body 102 having an outer wall 104 threaded at its central portion 106. The threaded portion 106 of the outer wall 104 is received by the internal threads of the adapter 60 as described above. The outer wall 104 has a pair of axially spaced annular flanges 108,110 formed between the threaded portion 106 and an outer end 112 of the valve body 102. A seal ring 114 is positioned around the outer wall 104 axially inwardly from the flange 108 to prevent escape of fluid across the threaded connection between the adapter 60 and the valve body 102.

The interior of the valve body 102 includes a small diameter cylindrical wall 116 and a large diameter cylindrical wall 118. An annular seat 119 is formed at the intersection of the walls 116,118. An undercut 120 is formed in the small diameter cylindrical wall 116 which intersects a plurality of radially spaced ports 122 passing through the outer wall 104. An internally threaded portion 124 is provided in the small diameter cylindrical wall 116 between the undercut 120 and an inner end 126 of the valve body 102. A small diameter return channel 128 is provided in the valve body 102 radially outbound of the small diameter cylindrical wall 116 between the seat 119 and the undercut 120. If desired, flow restrictors (not illustrated) can be mounted in the return channel 128. A groove 130 is formed in the outer wall 104 between the ports 122 and the inner end 126 of the valve body 102. A seal ring 132 is retained in the groove 130 and provides a fluid seal against the adapter 60.

A center pole 134 has a central body 136, a short extension 138 projecting from one end of the body 136, and a long extension 140 projecting from the opposite end of the body 136. The outer diameter of the body 136 is complementary to and received in the small diameter cylindrical wall 116 of the valve body 102. A pilot pressure chamber 142 is formed as a longitudinal channel along the axis of the center pole 134. An internal cavity 144 having a diameter greater than the pilot pressure chamber 142 is formed in the short extension 138 and connected to the pilot pressure chamber 142 by an annular shoulder 146. An internal cavity 148 having a diameter greater than the pilot pressure chamber 142 is formed in the long extension 140. A tubular, hardened insert 150 is press-fitted into the cavity 148 and preferably protrudes slightly beyond the long extension 140. An annular depression 152 is formed in an end of the body 136 which encircles the short extension 138. An undercut 154 is formed in the outer circumference of the short extension 138 adjacent the body 136 to form an annular seat 156. Preferably, the remainder of the outer circumference of the short extension 138 is threaded as illustrated in the FIGS. 2 and 3. A plurality of angled spur channels 158 provide fluid communication between the pilot pressure chamber 142 and the depression 152.

A disc and seal assembly 160 includes a flexible disc 162 and a reinforced seal 164. Preferably, the seal 164 is affixed to the disc 162 by any suitable means, including an adhesive. The disc 162 is flexible in response to axial fluid motion described below. The seal 164 is a cup-shaped rubber element having an annular, curved flange 166 and preferably reinforced with a stainless steel mesh 167. As described below, the flange 166 forms a dynamic face seal against the periphery of an inner wall of the depression 152 as the disc 162 deflects.

The disc and seal assembly 160 is received over the short extension 138 through respective openings so that the disc 162 rests on the seat 156. The flange 166 of the seal 164 is fitted into the depression 152 and the disc 162 is fitted within the inner cylindrical wall of the depression 152.

A valve nut 168 retains the disc and seal assembly 160 on the center pole 134. The valve nut 168 is a cylindrical element having a central opening 170 in a hub 171 and a plurality of fluid ports 172 surrounding the hub 171. An annular, raised seat 173 is provided on a surface of the valve nut 168 facing the disc and seal assembly 160 radially outbound of the ports 172. Internal threads 174 are provided on an inner cylindrical wall of the central opening 170 and external threads 176 are provided about the circumference of the valve nut 168. The internal threads 174 are mated with the external threads of the short extension 138. Simultaneously, external threads 176 are mated with the internal threads 124 of the small diameter cylindrical wall 116 of the valve body 102. When the valve nut 168 is threaded onto the short extension 138, the disc 162 rests against the seat 173 to inhibit fluid flow through the ports 172 as the seal and disc assembly 160 is clamped between the seat 156 and the valve nut 168.

A cup-shaped restrictor 178 is press-fitted into the cavity 144 provided in the short extension 138. The restrictor 178 includes a small diameter opening or pilot orifice 180 to permit fluid to pass into the pilot pressure chamber 142 as described below.

A small cylindrical retainer 182 is press-fitted over the hub 171 of the valve nut to secure a filter 184. A large cylindrical retainer 186 is press-fitted over the inner end 126 of the valve body 102 to secure a filter 188. The filter 188 screens fluid entering the ports 172 and the opening 170 of the hub 171, while the filter 184 screens only fluid entering the opening 170. The filters 184,188 can be formed from any suitable material, including phosphor-bronze screen.

An electric solenoid assembly 189 is mounted on the long extension 140 of the center pole 134 and is received in the large diameter cylindrical wall 118 of the valve body 102. The solenoid 189 includes a tubular bobbin 190 having an axial opening for receiving the long extension 140. Terminal pins 192 (only one of which is illustrated in FIG. 2) are pressed into the bobbin 190 prior to the winding of a coil 194 on the bobbin 190. Lead wires 196 are crimped to the terminal pins 192 and extend to an electric controller (not illustrated). A cup-shaped ring pole 198 is inserted over the bobbin 190 and coil 194. A non-conductive encapulant 199 is provided about the coil 194 and ring pole 198 and the wires 196 to a position beyond the valve body 102. A hinged or tapered armature 200 is positioned within a non-magnetic ring spacer 202 so that the hinged armature 200 rests on an outer end of the hardened insert 150. An armature plate 204 is captured between the ring spacer 202 and an end cap 206 and limits the range of movement of the tapered armature 200 as described below. The very small range of travel between the hinged armature 200 and the armature plate 204 provides real time pressure change in the pilot pressure chamber 142 in response to electrical signals to the coil 194. A flange 208 on the end cap 206 is crimped onto the outer flange 110 of the valve body 102 to retain the solenoid assembly 189. A pair of seal rings 210,212 are provided about the solenoid assembly 189 to prevent fluid leaks from the valve body 102. The structure and operation of a similar solenoid-actuated tapered armature is fully described in U.S. Pat. No. 4,572,436 assigned to the assignee of this invention.

In operation, the piston 24 and piston rod 32 reciprocate inside the inner cylinder 20 in a well-known manner. Fluid in the upper chamber 26 is directed by ports 54 to the annular bypass channel 56 and receiving chamber 58. At this point, fluid at a supply pressure passes through filters 188,184 and enters the electro-hydraulic pressure regulating valve assembly 100 described above.

The majority of fluid (the main flow) that enters the valve assembly 100 passes through the ports 172 of the valve nut 168 and deflects the disc 162 away from the valve nut 168. The seal 164 prevents fluid leakage around the perimeter of the deflected disc 162. When the disc 162 is deflected, fluid passes through the ports 122 in the valve body 102 and the radial channels 66 of the adapter 60 to enter the reservoir 22. From the reservoir 22, fluid returns to the lower chamber 28 through the compression valve assembly 30 in a well-known manner.

The solenoid assembly 189 is used to control fluid pressure in the pilot pressure chamber 142 and, therefore, the deflection of the disc 162 and fluid flow past it. A small amount of fluid (the pilot flow) entering the valve assembly 100 passes through the pilot orifice 180 in the restrictor 178 to reach the pilot pressure chamber 142. This pilot flow remains substantially constant into the pilot pressure chamber 142. When the solenoid assembly 189 is not energized, pressure in the chamber 142 reaches a sufficient level to cause the tapered armature 200 to be unseated from the hardened insert 150. Fluid flows from the interior of the end cap 206 to the return channel 128 to ports 122 and channels 66 to return to the reservoir 22.

When the solenoid assembly 189 is energized, the tapered armature 200 is pulled toward the hardened insert 150, restricting pilot flow from exiting through the insert 150 and increasing pressure in the chamber 142. Increased fluid pressure in the chamber 142 and spur channels 158 resists the deflection of the disc 162 as fluid presses against the cup-shaped seal 164, resulting in an increase in fluid pressure in the damper 10. In this manner, the amount of electrical current applied to the solenoid assembly 189 can continuously vary the damping of the damper 10.

A damper 10 according to the present invention can be installed at each wheel assembly of a vehicle. An electronic controller can receive various inputs from accelerometers and position sensors along with vehicle speed, brake status and steering position. A control algorithm determines an optimal damping force and energizes the respective solenoid assemblies 189 to change the fluid pressures in the dampers. Each corner can be independently changed to provide a desired damping.

Although the present invention has been described with reference to a preferred embodiment, workers skilled in the art will recognize that changes may be made in form and detail without departing from the spirit and scope of the invention.

The embodiments of the invention in which an exclusive property or privilege is claimed are defined as follows:

1. An electro-hydraulic pressure regulating valve for disposition on a support structure, comprising:
   (a) a valve body disposed on the support structure so that an inner end of the valve body is in fluid communication with a source of fluid at a supply pressure and an outer end of the valve body is sealed;
   (b) a fluid chamber provided in a center pole mounted within the valve body;
   (c) flow restrictor means for providing a pilot flow of fluid from a source of fluid to the fluid chamber;
   (d) electric solenoid-controlled valve means, mounted about the center pole within the valve body, for controlling the pressure of fluid in the fluid chamber;
   (e) port means in the valve body for routing fluid from the source of fluid to a reservoir; and
   (f) deflectable disc means for controlling the flow of fluid through the port means, wherein the disc means is in fluid communication with the fluid chamber so that pressure in the fluid chamber opposes the deflection of the disc means.

2. The pressure regulating valve specified in claim 1 including elastomeric seal means adjacent the disc means for preventing fluid leakage from the fluid chamber to the reservoir.

3. The pressure regulating valve specified in claim 2 wherein the seal means comprises a planar portion in contact with the deflectable disc means and an annular band in contact with the center pole.

4. The pressure regulating valve specified in claim 2 wherein the elastomeric seal means is reinforced with a wire mesh.

5. The pressure regulating valve specified in claim 1 wherein the solenoid-controlled valve means includes a tapered armature for controlling fluid exiting the fluid chamber to the reservoir.

6. The pressure regulating valve specified in claim 1 wherein the fluid chamber is formed as a longitudinal channel in the center pole.

7. The pressure regulating valve specified in claim 5 including a hardened insert in the center pole to provide a stop for the armature.

8. A pressure regulating valve assembly comprising:
   (a) a valve body have an inlet first end and a sealed second end;
   (b) a center pole received within the valve body;
   (c) a pilot pressure chamber formed in the center pole for receiving a fluid;
   (d) a solenoid assembly received within the valve body for controlling the exit of fluid from the pilot pressure chamber; and
   (e) a seal and disc assembly mounted on the center pole in fluid communication with the pilot pressure chamber for controlling fluid entering the valve body.

9. The pressure regulating valve assembly specified in claim 8 wherein the seal and disc assembly comprises:
   (a) a deflectable disc, and
   (b) an elastomeric seal having a planar portion against the disc and an annular band against the center pole for preventing leakage of fluid pass the disc and out of the pilot pressure chamber.

10. The pressure regulating valve assembly specified in claim 9 wherein the elastomeric seal is reinforced.

11. The pressure regulating valve assembly specified in claim 8 wherein the solenoid assembly includes a tapered armature for controlling exiting fluid flow.

12. The pressure regulating valve assembly specified in claim 11 including a hardened insert in the pilot pressure chamber to provide a stop for the armature.

13. A hydraulic damper for a suspension system comprising:
   (a) a reservoir tube secured to a wheel assembly;
   (b) a fluid-filled inner cylinder concentrically mounted in the reservoir tube;
   (c) a fluid reservoir formed in the interior volume between the inner cylinder and the reservoir tube;
   (d) a piston, reciprocally mounted in the inner cylinder, secured to a piston rod extending through an upper end of the inner cylinder and dividing the interior of the inner cylinder into upper and lower chambers;
   (e) piston valve means for controlling the flow of fluid from the lower chamber to the upper chamber as the piston reciprocates;
   (f) compression valve means for controlling the flow of fluid from the reservoir to the lower chamber as the piston reciprocates;
   (g) bypass channel means for receiving fluid from the upper chamber as the piston reciprocates; and
   (h) valve means for controlling the flow of fluid from the bypass channel means to the reservoir including
      (i) a valve body having an inlet first end mounted on the reservoir tube and a sealed second end;
      (ii) a center pole mounted within the valve body;
      (iii) a pressure control fluid chamber formed in the center pole for receiving fluid from the bypass channel means;
      (iv) solenoid means mounted on the center pole within the valve body for controlling fluid pressure in the pressure control chamber; and
      (v) deflectable disc means mounted on the center pole for directing fluid entering the valve means to the reservoir dependent upon fluid pressure in the pressure control chamber.

14. The damper specified in claim 13 including elastomeric seal means adjacent the deflectable disc means for preventing fluid leakage from the pressure control chamber.

15. The damper specified in claim 14 wherein the seal means comprises a planar portion against the deflectable disc means and an annular band adjacent the center pole.

16. The damper specified in claim 14 wherein the seal means is reinforced.

17. The damper specified in claim 13 wherein the solenoid means includes a tapered armature for controlling fluid exiting the pressure control chamber.

18. A continuously variable real time damper comprising:
   (a) a fluid-filled cylinder;
   (b) a piston reciprocally mounted in the cylinder dividing the interior of the inner cylinder into upper and lower chambers and including valving to permit fluid to flow only from the lower chamber to the upper chamber;
   (c) means for directing fluid from the upper chamber to a fluid reservoir;
   (d) means for directing fluid from the reservoir to the lower chamber; and
   (e) pressure regulating valve means provided between the upper chamber and reservoir comprising:
      (i) a valve body having an inlet first end and sealed second end;
      (ii) a center pole mounted within the valve body;
      (iii) a fluid chamber formed in the center pole receiving a pilot flow of fluid from the upper chamber;
      (iv) electric solenoid means mounted on the center pole within the valve body for controlling fluid pressure in the fluid chamber;
      (v) port means in the valve body for directing fluid entering the valve means to the reservoir; and
      (vi) deflectable disc means mounted on the center pole in fluid communication with the fluid chamber for controlling the flow through the port means.

19. The damper specified in claim 18 including elastomeric seal means adjacent the disc means for preventing fluid leakage from the fluid chamber.

20. The damper specified in claim 19 wherein the seal means comprises a planar portion against the disc means and an annular band against the center pole.

21. The damper specified in claim 19 wherein the seal means is reinforced.

22. The damper specified in claim 18 wherein the solenoid means includes a tapered armature for controlling fluid exiting the fluid chamber.

* * * * *